United States Patent [19]

Sargent et al.

[11] Patent Number: 5,672,279

[45] Date of Patent: Sep. 30, 1997

[54] METHOD FOR USING UREA HYDROCHLORIDE

[75] Inventors: R. Richard Sargent, Rome; Jeffrey Randolph Alender, Marietta; Thomas Hudson Moss, III, Rome, all of Ga.

[73] Assignee: Peach State Labs, Inc., Rome, Ga.

[21] Appl. No.: 233,348

[22] Filed: Apr. 25, 1994

Related U.S. Application Data

[60] Continuation-in-part of Ser. No. 90,797, Jul. 12, 1993, abandoned, which is a division of Ser. No. 919,523, Jul. 24, 1992, Pat. No. 5,234,466.

[51] Int. Cl.$^6$ .......................................... C02F 5/12
[52] U.S. Cl. .................. 210/698; 134/3; 134/22.14; 134/22.19; 162/45; 162/48; 252/180; 210/701; 510/240; 510/245
[58] Field of Search .................. 134/3, 22.11, 19, 134/22.14, 22.19; 210/698–701; 162/45, 48; 252/87, 142, 148, 180, 181, 82

[56] References Cited

U.S. PATENT DOCUMENTS

| | | | |
|---|---|---|---|
| 3,936,316 | 2/1976 | Gulla | 134/3 |
| 3,953,352 | 4/1976 | Mizutani et al. | 252/142 |
| 4,164,477 | 8/1979 | Whitley | 252/99 |
| 4,285,738 | 8/1981 | Ogata | 134/26 |
| 4,448,841 | 5/1984 | Glass et al. | 428/270 |
| 4,466,893 | 8/1984 | Dill | 166/307 |
| 4,673,522 | 6/1987 | Young | 252/148 |
| 4,756,888 | 7/1988 | Gallup et al. | 210/702 |
| 4,830,766 | 5/1989 | Gallup et al. | 210/696 |
| 4,882,202 | 11/1989 | Holtzan et al. | 427/98 |
| 4,894,169 | 1/1990 | Delitsky | 210/698 |
| 5,234,466 | 8/1993 | Sargent et al. | 8/585 |
| 5,308,401 | 5/1994 | Geke et al. | 134/2 |

FOREIGN PATENT DOCUMENTS

| | | |
|---|---|---|
| 37811 | 2/1986 | Hungary. |
| WO 94/02549 | 2/1994 | WIPO. |

*Primary Examiner*—Peter A. Hruskoci
*Attorney, Agent, or Firm*—Kilpatrick & Cody

[57] ABSTRACT

A method to remove the build-up of water-insoluble metal salts on surfaces, and a method to lower the solids content of industrial liquids that contain water-insoluble metal salts using urea hydrochloride or its equivalent. Also disclosed is a method to use urea hydrochloride or an equivalent strong acid/weak base salt as acid replacements for a variety of purposes.

5 Claims, No Drawings

METHOD FOR USING UREA HYDROCHLORIDE

This application is a continuation-in-part of and claims priority to U.S. Ser. No. 08/090,797, filed on Jul. 12, 1993 now abandoned, which is a divisional of, and claims priority to U.S. Ser. No. 07/919,523, filed on Jul. 24, 1992, entitled "Lowering the pH of Textile Processing Solution by Adding Urea Sulfate as a pH Adjusting Agent," by R. Richard Sargent and Jeffrey R. Alender, now U.S. Pat. No. 5,234,466.

This application describes methods for the use of urea hydrochloride.

BACKGROUND OF THE INVENTION

Calcium carbonate is often used or produced in industrial processes. Calcium carbonate is used, for example, as a source of lime, a neutralizing agent, a filler or extender in rubber, paints, and plastics, in the fortification of bread, putty, tooth powders, antacid, and whitewash. It is also used in portland cement and metallurgical flux. Calcium carbonate is alternatively referred to as chalk, calcite, marble, limestone, and whiting. One major use of calcium carbonate is as an opacifying agent in paper production and recycling.

A disadvantage of using calcium carbonate is that it is only very slightly soluble in water, and thus tends to build up as a deposit on surfaces, or form a dispersion in water-based liquids. These residues and dispersions can be a nuisance or, more importantly, can adversely affect industrial processes or equipment. For example, $CaCO_3$ used in paper manufacture and recycling enters the effluent of the plant as a suspended solid that raises the pH of the water and causes the water to appear chalky. This effluent cannot be disposed of in publicly owned treatment facilities because of its solids content and pH. In a typical process, hydrochloric acid is added to the water to dissolve the calcium carbonate, removing the dispersion, and then the pH is adjusted to approximately neutral with base. However, hydrochloric acid is a gas that can corrode equipment and is noxious to humans.

Calcium carbonate is also a major cause of boiler scale when hard water is used in heating systems. It is sometimes difficult to remove the calcium carbonate boiler residue in a manner that does not adversely affect the equipment.

U.S. Pat. No. 4,830,766 discloses a method for treating an aqueous geothermal fluid that contains dissolved ferric cations and silicous material that tend to interact to form insoluble iron silicates, that includes adding a variety of reducing agents, including urea, urea hydrochloride, formamide, formamide hydrochloride, oxalic acid, and ascorbic acid.

Hungarian Patent No. 37,811 (Chem Abstr. 105:117062z 1986) discloses a composition for the removal of scale that includes hydrochloric acid (3–10%), urea or thiourea (0.2–1.0%), hexamethylenetetramine (0.2–1.5%) and water.

It is an object of the present invention to provide a method to remove the build-up of water-insoluble metal salts on surfaces.

It is another object of the present invention to provide a method to lower the solids content of industrial liquids that contain water-insoluble metal salts.

It is another object of the present invention to provide a method for the treatment of effluent from paper manufacturing and recycling processes.

It is another object of this invention to provide a method for the removal of water-insoluble salt residue from masonry.

SUMMARY OF THE INVENTION

It has been discovered that urea hydrochloride is an inexpensive and useful agent for the removal of the build-up of water-insoluble metal salts on surfaces, and the dissolution of water-insoluble metal salt dispersions or suspensions. Urea hydrochloride is also useful in the neutralization of alkaline processing or waste streams, including those generated from paper manufacturing and recycling. Urea hydrochloride is especially useful in the removal or dissolution of calcium carbonate.

Urea hydrochloride can be formed with any desired ratio of urea and hydrochloric acid that performs the desired function. Examples of suitable salts include those formed by combining between 1:4 and 4:1 moles of urea with hydrochloric acid, more usually between 2.5 and 0.25 or 0.5 moles of urea with one mole of hydrochloric acid. A preferred composition contains at least approximately 1 mole of urea to one mole of hydrochloric acid, for example, a ratio of between approximately 1 and 2 moles of hydrochloric acid.

The use of urea hydrochloride to remove the build-up of water-insoluble metal salts on surfaces, and to dissolve water-insoluble metal salt dispersions or suspensions, has advantages over conventional methods using hydrochloric acid or other agents. For example, urea hydrochloride is less corrosive to metal equipment and other contact surfaces than the equivalent amount of hydrochloric acid, and has a significantly less tendency to release hydrogen chloride gas. Urea hydrochloride or its equivalent has the same or similar ability to dissolve insoluble salts or perform other functions as the equivalent amount of uncomplexed HCl, based on the total weight of HCl in the composition.

In a preferred embodiment, urea is the only base used in combination with hydrochloric acid in the composition. In an alternative embodiment, the salt of any strong acid with urea or other weak base can be used in place of urea hydrochloride if, when combined with a water insoluble metal salt, it produces a water soluble metal salt. Examples include mixtures of strong acids with, for example, alkanolamines, including triethanolamine, diethanolamine, monoethanolamine and HO—[(alkyl)O]$_x$—CH$_2$)$_y$NH$_2$, including HO—[(CH$_2$)$_x$O]—CH$_2$)$_x$NH$_2$; wherein the alkyl group can vary within the moiety, wherein x is 1–8 (which can vary within the moiety) and y is an integer of 1 to 40; alkylamines, dialkylamines, trialkylamines, alkyltetramines, polymers with amino or (alkyl or aryl)amino substituent groups, polymers with nitrogen-containing heterocyclic groups, acrylamide, polymers and copolymers of acrylamide, vinyl pyrollidone, polyvinyl pyrollidone, copolymers of vinyl pyrollidone, methacrylamide, polymethacrylamide, copolymers of acrylamide, and ammonia (which when combined with HCl forms ammonium chloride, which dissolves water-insoluble salts at a slow rate). Mixtures of these bases can also be used.

DETAILED DESCRIPTION OF THE INVENTION

The term water insoluble salt refers to a salt that is soluble in water at a concentration of not greater than 1, and typically not greater than 0.1 gm/liter, under ambient conditions. The term water soluble salt refers to a salt that is soluble in water at a concentration of greater than that of a water insoluble salt.

The term alkyl, as used herein, unless otherwise specified, refers to a saturated straight, branched, or cyclic (in the case of $C_5$ or greater) hydrocarbon of $C_1$ to $C_{30}$, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, 2,3-dimethylbutyl, heptyl, octyl, nonyl, decyl, and dodecyl.

The term aryl, as used herein, refers to phenyl and substituted phenyl, wherein the substituent is amino, alkyl, halo (chloro, bromo, iodo, or chloro), hydroxy, sulfonyl, carboxylic acid, nitro, or a combination of these, and wherein the aromatic ring can have up to three substituents.

The invention as disclosed is, in one embodiment, a method to remove the build-up of water-insoluble metal salts on surfaces, and a method to lower the solids content of industrial liquids that contain water-insoluble metal salts using urea hydrochloride or its equivalent. In a specific embodiment, a method is provided to adjust the pH of textile treatment baths, effluent streams, and processing water, including effluent from paper manufacturing and recycling, using urea hydrochloride or its equivalent. Urea hydrochloride or its equivalent can also be used to adjust the pH of dying baths, and other aqueous baths, including recreational waters such as swimming pools and hot tubs.

Urea hydrochloride, as well as the equivalent strong acid/weak base salts disclosed herein, can also be used as an acid replacement in any process that hydrochloric acid (also referred to as muriatic acid) has traditionally been used in, including but not limited to acidizing (activation) of petroleum wells, boiler scale removal, ore reduction, food processing (e.g, corn syrup and sodium glutamate), pickling and metal cleaning, industrial acidizing, general cleaning (e.g., of membrane in desalination plants), alcohol denaturizing, production of vinyl chloride from acetylene and alkyl chlorides from olefins, hydrochlorination, polymerization reactions, isomerization, alkylation, and nitration reactions. Urea hydrochloride can replace traditional acids for solvation, in aqueous cleaning solutions, and in other processing solutions. Materials that can be cleaned include wire, metals, jewelry, printed circuit boards, wood, masonry, mortar, concrete, painted surfaces, plastics, polymeric substances, and the like.

In a preferred embodiment, urea hydrochloride or its equivalent disclosed herein is used to solubilize water insoluble metal salts, such as carbonates, for example, those with calcium, barium, aluminum, strontium, beryllium, and magnesium counterions.

Urea hydrochloride, as well as the equivalent strong acid/weak base salts disclosed herein, can be also be used to prepare surfaces for electroplating, and to clean surfaces used in the electronics industry.

Preparation of Urea Hydrochloride

Urea is weakly basic, forming salts with strong acids. Urea hydrochloride is a salt formed from the simple mixture of urea with hydrochloric acid. Common urea hydrochloride salts include the 1:1 urea to hydrochloric acid salt (CAS 506-89-8), and the 1:2 urea to hydrochloric acid salt. The 1:1 urea hydrochloric acid salt is sold by Esprit Chemical Company (Rockland, Mass.). Any desired ratio of urea to hydrochloric acid that performs the desired function can be prepared by simply mixing the appropriate ratios of components, typically in water. The mixing of urea with hydrochloric acid typically results in a slight exotherm that should be handled with care.

Any amount of urea hydrochloride can be used in the methods described herein, with any molar ratio of urea and hydrochloric acid, that performs the desired function. The preferred composition is a solution of hydrochloric acid and urea combined in a molar ratio of at least approximately 1 mole of urea to one mole of hydrochloric acid, or a slight excess of urea, in water. This composition results in a hydrochloric acid urea salt solution that has the pH reduction ability and insoluble metal salt dissolution ability of hydrochloric acid but is less corrosive than hydrochloric acid.

Given the disclosure herein, one of ordinary skill in the art can easily manipulate the ratio of urea and hydrochloric acid, and the amount of urea hydrochloride used, to obtain a desired result. Methods to determine pH are well known to those of skill in the art.

It is recommended that the desired salt, as opposed to the individual components, be added to aqueous solutions to avoid a dilution effect, as well as corrosivity and safety problems associated with addition of the strong acid in the uncomplexed form.

Additives

Additives can be added to the urea hydrochloride or equivalent solution as desired to increase the usefulness of the agent.

Additives include, but are not limited to, surfactants, hydrotropes (for example sodium or ammonium salts of alkyl sulfonic acid or aryl sulfonic acid, specifically including xylene sulfonic acid, toluene sulfonic acid, benzene sulfonic acid, cumene sulfonic acid, dodecylbenzene sulfonic acid, dodecyl diphenyloxide disulfonic acid, and naphthalene sulfonic acid), corrosion inhibitors, nitric acid (to increase the strength of the acid), cleaning agents (including detergents and shampoos), emulsifiers, and appropriate organic solvents.

Surfactants and emulsifiers are surface active agents that modify the surface energy between two liquid phases. The characteristics of surfactants and their applicability for a wide variety of applications are described by Rosen in *Surfactants and Interfacial Phenomena*, 2nd Edition (John Wiley and Sons, N.Y.), incorporated herein by reference. In general, the desired chemical structures of the hydrophilic and hydrophobic portions of the surfactant will vary with the nature of the solvent and the conditions of use. As discussed by Rosen, in a highly polar solvent such as water, the hydrophobic group can be, for example, a hydrocarbon, fluorocarbon or siloxane chain of proper length, whereas in a less polar solvent such as an alcohol, a very nonpolar moiety is required in the hydrophobic part of the surfactant. If a surface is to be made hydrophobic by the use of a surfactant, a cationic surfactant is usually preferred. If a surface is to be made hydrophilic, in general, then anionic surfactants should be considered. Nonionic surfactants adsorb onto surfaces with either the hydrophilic or hydrophobic group oriented toward the surface, depending on the nature of the surface.

EXAMPLE 1

Preparation of Urea Hydrochloric Acid 1:1 Salt.

To muriatic acid (65 parts of 20 degree baume (31.45% minimum, 32.5% average by weight)) was added prilled urea (35 parts). The mixture was mixed at room temperature, during which time a slight exotherm occurred.

EXAMPLE 2

Preparation of Urea Hydrochloric Acid 2:1 Salt.

To muriatic acid (130 parts of 20 degree baume (31.45% is minimum, 32.5% average by weight)) is added prilled urea (35 parts). The mixture is mixed at room temperature, during which time a slight exotherm occurs.

Strong Acid Weak Base Salts As Equivalents to Urea Hydrochloride

In an alternative embodiment, a salt formed by the combination of a strong acid with a weak base other than urea hydrochloride is used to remove the build-up of water-insoluble metal salts on surfaces, and to lower the insoluble solids content of industrial liquids that contain water-insoluble metal salts.

A strong acid/weak base salt should be selected that forms a water soluble salt when mixed with a water insoluble salt under the conditions of use. Certain salts of urea, such as urea sulfate, cannot be used, for example, to remove the build-up of calcium carbonate because they form new water insoluble salts, i.e., calcium sulfate.

Strong acids are acids that are completely ionized in water. Ebbing, D. D., and Wrighton, M. S., "General Chemistry, Second Edition," Houghton Mifflin Company, Boston, pp. 327 (1987). Examples of strong acids include mineral acids such as nitric, hydrochloric, hydrobromic, hydroiodic, hydrofluoric, and others. Some acids commonly considered "weak" acids are also suitable, including but not limited to formic, acetic, hydroxyacetic, and thioglycolic acids.

Weak bases are bases that are only partly ionized in water. Ebbing, D. D., and Wrighton, M. S., "General Chemistry, Second Edition," Houghton Mifflin Company, Boston, pp. 327 (1987). Nonlimiting examples of organic and inorganic bases are found on pages 8-37 through 8-39 in the "CRC Handbook of Chemistry and Physics," 72nd Edition, CRC Press, (1992), hereby incorporated by reference. Examples of weak bases include urea acetylurea, alkanolamines, including triethanolamine, diethanoamine, monoethanolamine and $HO-[(alkyl)O]_x-CH_2)_y NH_2$, including $HO-[(CH_2)_xO]-CH_2)_x NH_2$; wherein the alkyl group can vary within the moiety, wherein x is 1-8 (which can vary within the 5 moiety) and y is an integer of 1 to 40; alkylamines (including methylamine, ethylamine, propylamine and butylamine), dialkylamines, alkyldiamines (including ethylenediamine), alkyltriamines, alkyltetramines, and trialkylamines, polymers with amino or (alkyl or aryl)amino substituent groups, including (mono or di)-alkylaminoalkylacrylate, and (mono or di)alkylaminoalkylmethacrylate, polymers with nitrogen-containing heterocyclic groups (including but not limited to pyridine, pyrimidine, imidazole, tetrazole, pyrazine, quinoline, isoquinoline, indole, isoindole, benzimidazole, purine, pyrrole, is pyrazole, quinazoline, pyridazine, pyrazine, cinnoline, phthalazine, quinoxaline, xanthine, hypoxanthine, and pteridine); amides, including formamide, acetamide, acrylamide, polymers and copolymers of acrylamide, and cyclic amides such as caprolactam; pyrrolidone, polyvinyl pyrrolidone, copolymers of vinyl pyrrolidone, methacrylamide, polymethacrylamide, copolymers of methacrylamide, ammonia, guanidine, hydroxyurea, semicarbazide; mono-, di-, or tri(alkyl or aryl)urea, and wherein in the case of di(alkyl or aryl)urea the alkyl or aryl groups can be on the same or different nitrogen atoms, O-methyl hydroxyl amine (methoxylamine), aniline, and hydrazine. Preferred bases are nitrogenous bases. Certain metal hydroxides, such as calcium and barium hydroxide, are weak bases and have low solubility in neutral media. However, they react with strong acids to form water and metal salts. These bases are not preferred because the resulting metal salts are relatively insoluble, compared to the acid salts of nitrogenous bases.

Examples of suitable salts include any salt that is formed by the combination of one or more of the acids listed above with one or more of the bases listed above, in any desired molar ratio. Examples specifically include urea hydrogen nitrate, ammonium chloride, urea hydrobromide, urea hydroiodide, urea hydrofluoride, formamide hydrochloride, and the HCl, HI, HBr, or HF salts of pyrrolidone or polyvinylpyrrolidone.

As a nonlimiting example, a 1:1 HCl salt of polyvinylpyrrolidone (PVP) can be prepared by mixing 36 grams of 20 degree baume HCl with 36 grams of PVP (average MW 29,800) and 28 grams of water.

A useful composition is a mixture of HCl, $HNO_3$, and urea, in any selected ratio. Mixtures of HCl and $HNO_3$ are known as aqua regia, a very strong acid that can dissolve almost any material, including gold. $HCl/HNO_3$ mixtures are commonly used to clean very dirty equipment. A disadvantage of $HCl/HNO_3$ is its extreme corrosiveness and its noxious fumes. A mixture of HCl, $HNO_3$, and urea provides the benefits of aqua regia while minimizing its corrosiveness and fumes. In a preferred composition, an amount of urea or other weak base, or combination thereof, is used that is at least equal to, and preferably greater than, the combined acid units of HCl and $HNO_3$ based on equivalents.

Any molar ratio of strong acid to weak base that serves the desired purpose can be used within the scope of this invention. Typical ratios, in terms of acid or base equivalents, are typically between approximately 4 to 1 and 1 to 4 acid:base equivalent units or a slight excess of base, in equivalence units. As with urea hydrochloride, at least one equivalent unit of base, or a slight excess of base, per equivalent unit of acid, is preferred.

Combinations of any of the weak bases described herein in combination with nitric acid, for example, urea nitrate, can be used as an acid replacement for any purpose that nitric acid is used for, including but not limited to, in the manufacture of ammonium nitrate for fertilizer and explosives, in organic syntheses, including in the preparation of nitro-containing compounds, in metallurgy, in photoengraving, in etching steel, in ore floatation, in the production of urethane and rubber chemicals, and in reprocessing spent nuclear fuel.

Combinations of any of the weak bases described herein in combination with hydrofluoric acid, such as urea hydrofluoride, for example, can be used as an acid replacement for any purpose that hydrofluoric acid or hydrogen fluoride is used for, including but not limited to, as a catalyst in alkylation, isomerization, condensation, dehydration, and polymerization reactions, as a fluorinating reagent in organic and inorganic reactions, in the production of aluminum, fluorine and aluminum fluoride, as an additive in liquid rocket propellants, in etching glass, in pickling stainless steel, and in the refining of uranium. Combinations of any of the weak bases described herein in combination with hydroiodic acid, such as urea hydroiodide, for example, can be used as an acid replacement for any purpose that hydroiodic acid or hydrogen iodide is used for, including but not limited to, the preparation of iodine salts, in organic preparations, as an analytical reagent, as a disinfectant, and in the preparation of pharmaceuticals.

Use of Urea Sulfate or its Equivalent

The following examples are nonlimiting examples of procedures for the removal of the build-up of water-insoluble metal salts on surfaces, and the dissolution of water-insoluble metal salt dispersions or suspensions. Given these examples, anyone of skill in the appropriate art can use the method disclosed herein to achieve the desired purpose.

EXAMPLE 3

Use of Urea Hydrochloride to Clean Masonry

A solution of urea hydrochloride is prepared by mixing 1 part water with 1 part of the produce of Example 1. The solution is applied to masonry, and the masonry optionally brushed or otherwise abraded appropriate. The masonry is then rinsed off with water.

EXAMPLE 4

Use of Urea Hydrochloride to Clean Boiler Scale

A solution of urea hydrochloride is prepared by mixing 3 parts water with 1 part of the product of Example 1. The boiler is filled with the solution, and then flushed as appropriate, typically after cessation of $CO_2$ evolution.

Modifications and variations of the present invention will be obvious to those skilled in the art from the foregoing detailed description of the invention. Such modifications and variations are intended to come within the scope of the appended claims.

We claim:

1. A method to solubilize calcium carbonate in aqueous suspensions or dispersions of calcium carbonate that includes adding to the suspensions or dispersions a sufficient amount of urea hydrochloride to convert the calcium carbonate to a water soluble salt, wherein a molar ratio of urea to hydrochloric acid approximately between 1:4 and 4:1 is used to form said urea hydrochloride.

2. The method of claim 1, wherein the calcium carbonate is in paper manufacturing process water.

3. The method of claim 1, wherein said ratio of urea to hydrochloric acid is approximately 2:1.

4. The method of claim 1, wherein said ratio of urea to hydrochloric acid is approximately 1:1.

5. The method of claim 1, wherein the calcium carbonate is in paper recycling process water.

* * * * *

(12) EX PARTE REEXAMINATION CERTIFICATE (10872nd)
United States Patent
Sargent et al.

(10) Number: US 5,672,279 C1
(45) Certificate Issued: May 25, 2016

(54) METHOD FOR USING UREA HYDROCHLORIDE

(75) Inventors: R. Richard Sargent, Rome, GA (US); Jeffrey Randolph Alender, Marietta, GA (US); Thomas Hudson Moss, III, Rome, GA (US)

(73) Assignee: PEACH STATE LABS, INC., Rome, GA (US)

Reexamination Request:
No. 90/011,628, May 9, 2011

Reexamination Certificate for:
| | |
|---|---|
| Patent No.: | 5,672,279 |
| Issued: | Sep. 30, 1997 |
| Appl. No.: | 08/233,348 |
| Filed: | Apr. 25, 1994 |

Related U.S. Application Data

(60) Continuation-in-part of application No. 08/090,797, filed on Jul. 12, 1993, now abandoned, which is a division of application No. 07/919,523, filed on Jul. 24, 1992, now Pat. No. 5,234,466.

(51) Int. Cl.
| | |
|---|---|
| *C02F 1/66* | (2006.01) |
| *D06P 1/64* | (2006.01) |
| *D06P 1/44* | (2006.01) |
| *D06P 1/62* | (2006.01) |
| *D21H 21/00* | (2006.01) |
| *D21H 21/04* | (2006.01) |
| *D06P 3/24* | (2006.01) |
| *D21C 9/00* | (2006.01) |
| *D06P 1/649* | (2006.01) |
| *D06M 11/00* | (2006.01) |
| *D06M 11/55* | (2006.01) |
| *D06M 13/432* | (2006.01) |
| *D06M 13/00* | (2006.01) |
| *C02F 5/00* | (2006.01) |
| *C02F 103/28* | (2006.01) |
| *C02F 103/42* | (2006.01) |

(52) U.S. Cl.
CPC .............. *C02F 1/66* (2013.01); *D06M 11/55* (2013.01); *D06M 13/432* (2013.01); *D06P 1/628* (2013.01); *D06P 1/6491* (2013.01); *D06P 3/241* (2013.01); *D21C 9/008* (2013.01); *D21H 21/04* (2013.01); *C02F 5/00* (2013.01); *C02F 2103/28* (2013.01); *C02F 2103/42* (2013.01)

(58) Field of Classification Search
None
See application file for complete search history.

(56) References Cited

To view the complete listing of prior art documents cited during the proceeding for Reexamination Control Number 90/011,628, please refer to the USPTO's public Patent Application Information Retrieval (PAIR) system under the Display References tab.

*Primary Examiner* — Evelyn Huang

(57) ABSTRACT

A method to remove the build-up of water-insoluble metal salts on surfaces, and a method to lower the solids content of industrial liquids that contain water-insoluble metal salts using urea hydrochloride or its equivalent. Also disclosed is a method to use urea hydrochloride or an equivalent strong acid/weak base salt as acid replacements for a variety of purposes.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-5 are cancelled.

* * * * *